(12) United States Patent
Tatsuta et al.

(10) Patent No.: US 11,662,316 B2
(45) Date of Patent: May 30, 2023

(54) FLUORESCENCE OBSERVATION APPARATUS AND FLUORESCENCE OBSERVATION METHOD

(71) Applicant: Sony Corporation, Tokyo (JP)

(72) Inventors: Hirokazu Tatsuta, Kanagawa (JP); Gakuji Hashimoto, Kanagawa (JP); Tetsuro Kuwayama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/058,091

(22) PCT Filed: May 30, 2019

(86) PCT No.: PCT/JP2019/021509
§ 371 (c)(1),
(2) Date: Nov. 23, 2020

(87) PCT Pub. No.: WO2019/230878
PCT Pub. Date: Dec. 5, 2019

(65) Prior Publication Data
US 2021/0199585 A1  Jul. 1, 2021

(30) Foreign Application Priority Data

May 30, 2018 (JP) .............................. JP2018-103507

(51) Int. Cl.
*G01N 21/64* (2006.01)
*G02B 21/00* (2006.01)
(Continued)

(52) U.S. Cl.
CPC ..... *G01N 21/6458* (2013.01); *G02B 21/0064* (2013.01); *G02B 21/0076* (2013.01);
(Continued)

(58) Field of Classification Search
CPC ......... G02B 21/367; G01N 2021/6423; G01N 2201/12761
See application file for complete search history.

(56) References Cited

U.S. PATENT DOCUMENTS

2003/0132394 A1*  7/2003  Wolleschensky .. G01N 21/6458
250/458.1
2004/0209300 A1* 10/2004  Storz .................... G01J 3/36
435/6.12
(Continued)

FOREIGN PATENT DOCUMENTS

CN    101793829 A    8/2010
EP    3 252 456 A2   12/2017
(Continued)

OTHER PUBLICATIONS

International Written Opinion and English translation thereof dated Aug. 27, 2019 in connection with International Application No. PCT/JP2019/021509.

(Continued)

*Primary Examiner* — David P Porta
*Assistant Examiner* — Meenakshi S Sahu
(74) *Attorney, Agent, or Firm* — Wolf, Greenfield & Sacks, P.C.

(57) ABSTRACT

A fluorescence observation apparatus according to an embodiment of the present technology includes a stage, an excitation section, and a spectroscopic imaging section. The stage is capable of supporting a fluorescently stained pathological specimen. The excitation section irradiates the pathological specimen on the stage with a plurality of line illuminations of different wavelengths, the plurality of line illuminations being a plurality of line illuminations situated on different axes and parallel to a certain-axis direction. The spectroscopic imaging section includes at least one imaging (Continued)

device capable of separately receiving pieces of fluorescence respectively excited with the plurality of line illuminations.

18 Claims, 15 Drawing Sheets

(51) Int. Cl.
*G02B 21/16* (2006.01)
*G02B 21/36* (2006.01)

(52) U.S. Cl.
CPC ........... *G02B 21/16* (2013.01); *G02B 21/367* (2013.01); *G01N 2021/6419* (2013.01); *G01N 2021/6423* (2013.01); *G01N 2201/12761* (2013.01)

(56) References Cited

U.S. PATENT DOCUMENTS

| | | |
|---|---|---|
| 2007/0147673 A1* | 6/2007 | Crandall .............. G02B 21/367 382/128 |
| 2009/0185167 A1 | 7/2009 | Gouch |
| 2009/0310213 A1 | 12/2009 | Hing et al. |
| 2013/0157261 A1 | 6/2013 | Sharpe et al. |
| 2013/0250088 A1 | 9/2013 | Osipchuk |
| 2014/0056505 A1 | 2/2014 | Hoyt |
| 2014/0233095 A1 | 8/2014 | Lee |
| 2017/0343475 A1 | 11/2017 | Yamada |
| 2019/0204577 A1* | 7/2019 | Faris .................... H04N 5/2256 |

FOREIGN PATENT DOCUMENTS

| | | |
|---|---|---|
| JP | 4452850 B2 | 4/2010 |
| JP | 2018-10018 A | 1/2018 |
| WO | WO 2013/142272 A1 | 9/2013 |
| WO | WO 2014/031735 A1 | 2/2014 |
| WO | WO 2017/223206 A1 | 12/2017 |

OTHER PUBLICATIONS

International Preliminary Report on Patentability and English translation thereof dated Dec. 10, 2020 in connection with International Application No. PCT/JP2019/021509.

Im et al., Simple high-speed confocal line-scanning microscope. Optics Express, Jun. 27, 2005, v13(13): 5151-5156.

Stack et al., Multiplexed immunohistochemistry, imaging, and quantitation: A review, with an assessment of Tyramide signal amplification, multispectral imaging and multiplex analysis. Nov. 2014, Methods v70(1): 46-58. Epub Sep. 19, 2014.

International Search Report and English translation thereof dated Aug. 27, 2019 in connection with International Application No. PCT/JP2019/021509.

* cited by examiner

| Illumination line | Configuration example 1 | Configuration example 2 | Configuration example 3 |
|---|---|---|---|
| Ex1 | 405nm | 405nm, 561nm | 405nm, 561nm, 488nm, 645nm |
| Ex2 | 488nm | 488nm, 645nm | — |
| Ex3 | 561nm | — | — |
| Ex4 | 645nm | — | — |

FLUORESCENCE OBSERVATION APPARATUS AND FLUORESCENCE OBSERVATION METHOD

CROSS-REFERENCE TO RELATED APPLICATIONS

This application claims the benefit under 35 U.S.C. § 371 as a U.S. National Stage Entry of International Application No. PCT/JP2019/021509, filed in the Japanese Patent Office as a Receiving Office on May 30, 2019, which claims priority to Japanese Patent Application Number JP2018-103507, filed in the Japanese Patent Office on May 30, 2018, each of which is hereby incorporated by reference in its entirety.

TECHNICAL FIELD

The present technology relates to, for example, a fluorescence observation apparatus and a fluorescence observation method that are used to perform diagnosis using a pathological image.

BACKGROUND ART

A pathological-image diagnosis using fluorescence staining has been proposed as a highly quantitative and polychromatic method (refer to, for example, Patent Literature 1). Compared with colored staining, the fluorescent approach has the advantage that it is possible to easily perform multiplexing and to obtain detailed diagnostic information. In fluorescence imaging other than fluorescence imaging used for pathological diagnosis, an increase in the number of colors makes it possible to examine, at a time, various antigens expressed in a sample.

In general fluorography, excitation light of an absorption wavelength (an excitation wavelength) of a dye is irradiated, and a dye spectrum emitted by the irradiation is selectively incorporated using a bandpass filter. When there exists a plurality of colors, the absorption wavelength (the excitation wavelength) varies depending on the dye. Thus, a method for performing image-capturing while switching a filter for each dye, is adopted. However, a plurality of dyes is excited at a single excitation wavelength when multicolor staining is performed, since an absorption spectrum and an emission spectrum of a dye are both broad and overlap. Further, fluorescence of an adjacent dye is leaked to a bandpass filter, and this results in color mixture.

On the other hand, a method for performing image-capturing while switching a wavelength of excitation light and a wavelength of detected fluorescence in a time-division manner, is known (for example, Non-Patent Literature 1). However, this method has a problem in which the image-capturing time is linearly increased as the number of colors is increased.

CITATION LIST

Patent Literature

Patent Literature 1: Japanese Patent No. 4452850

Non-Patent Literature

Non-Patent Literature 1: Edward C. Stack, "Multiplexed immunohistochemistry, imaging, and quantitation: A review, with an assessment of Tyramide signal amplification, multispectral imaging and multiplex analysis", Methods 70 (2014) 46-58

DISCLOSURE OF INVENTION

Technical Problem

In view of the circumstances described above, it is an object of the present technology to provide a fluorescence observation apparatus and a fluorescence observation method that make it possible to suppress an increase in the image-capturing time that is associated with an increase in the number of observation-target dyes.

Solution to Problem

A fluorescence observation apparatus according to an embodiment of the present technology includes a stage, an excitation section, and a spectroscopic imaging section.

The stage is capable of supporting a fluorescently stained pathological specimen.

The excitation section irradiates the pathological specimen on the stage with a plurality of line illuminations of different wavelengths, the plurality of line illuminations being a plurality of line illuminations situated on different axes and parallel to a certain-axis direction.

The spectroscopic imaging section includes at least one imaging device capable of separately receiving pieces of fluorescence respectively excited with the plurality of line illuminations.

This makes it possible to suppress an increase in the image-capturing time that is associated with an increase in the number of observation-target dyes.

The excitation section may be configured to irradiate, onto the pathological specimen and as the plurality of line illuminations, a plurality of line illuminations each having different wavelengths in combination.

The spectroscopic imaging section may further include a wavelength dispersion element that separates each of the pieces of fluorescence respectively excited with the plurality of line illuminations.

The spectroscopic imaging section may further include an observation slit including a plurality of slit portions, each of the pieces of fluorescence respectively excited with the plurality of line illuminations being allowed to pass through a corresponding one of the plurality of slit portions.

The fluorescence observation apparatus may further include a scanning mechanism that scans the plurality of line illuminations over the stage in a direction orthogonal to the certain-axis direction.

The fluorescence observation apparatus may further include a processing unit that includes a storage that stores therein spectroscopic data that indicates a correlation between a wavelength of each of the plurality of line illuminations and fluorescence received by the imaging device.

The processing unit may further include an image formation section that forms a fluorescence image of the pathological specimen on the basis of the spectroscopic data stored in the storage and an interval between the plurality of line illuminations.

The image formation section may be configured to form, as the fluorescence image, an image in which coordinates detected by the imaging device have been corrected using a value corresponding to the interval between the plurality of line illuminations.

The processing unit may further include a data calibration section that calibrates spectroscopic data stored in the storage.

The storage may store therein standard spectra in advance, the standard spectra being a standard spectrum of autofluorescence related to the pathological specimen and a standard spectrum of only a dye that stains the pathological specimen, and the image formation section may be configured to output a component distribution of the spectroscopic data on the basis of the standard spectrum of the autofluorescence and the standard spectrum of only the dye.

The imaging device may include a plurality of imaging devices each capable of receiving the fluorescence passing through the observation slit.

The fluorescence observation apparatus may further include a non-fluorescence observation section that includes a light source that illuminates the pathological specimen on the stage, and an imaging section that acquires a non-fluorescence image of the pathological specimen.

The fluorescence observation apparatus may further include a display section that displays fluorescence spectra separately for each of the plurality of line illuminations, the fluorescence spectra being respectively excited with the plurality of line illuminations.

The display section may include an operation region in which a wavelength and output of each of the plurality of line illuminations are allowed to be set.

The display section may include a display region used to display a detection wavelength range for the fluorescence spectrum.

A fluorescence observation method according to an embodiment of the present technology includes:

irradiating a pathological specimen on a stage with a plurality of line illuminations of different wavelengths, the plurality of line illuminations being a plurality of line illuminations situated on different axes and parallel to a certain-axis direction; and separately receiving pieces of fluorescence respectively excited with the plurality of line illuminations.

The fluorescence observation method may further include scanning the plurality of line illuminations over the stage in a direction orthogonal to the certain-axis direction.

A plurality of line illuminations each having different wavelengths in combination may be used as the plurality of line illuminations.

Advantageous Effects of Invention

As described above, the present technology makes it possible to suppress an increase in the image-capturing time that is associated with an increase in the number of observation-target dyes.

Note that the effect described here is not necessarily limitative, and any of the effects described in the present disclosure may be provided.

MODE(S) FOR CARRYING OUT THE INVENTION

Embodiments according to the present technology will now be described below with reference to the drawings.

Figure 1:
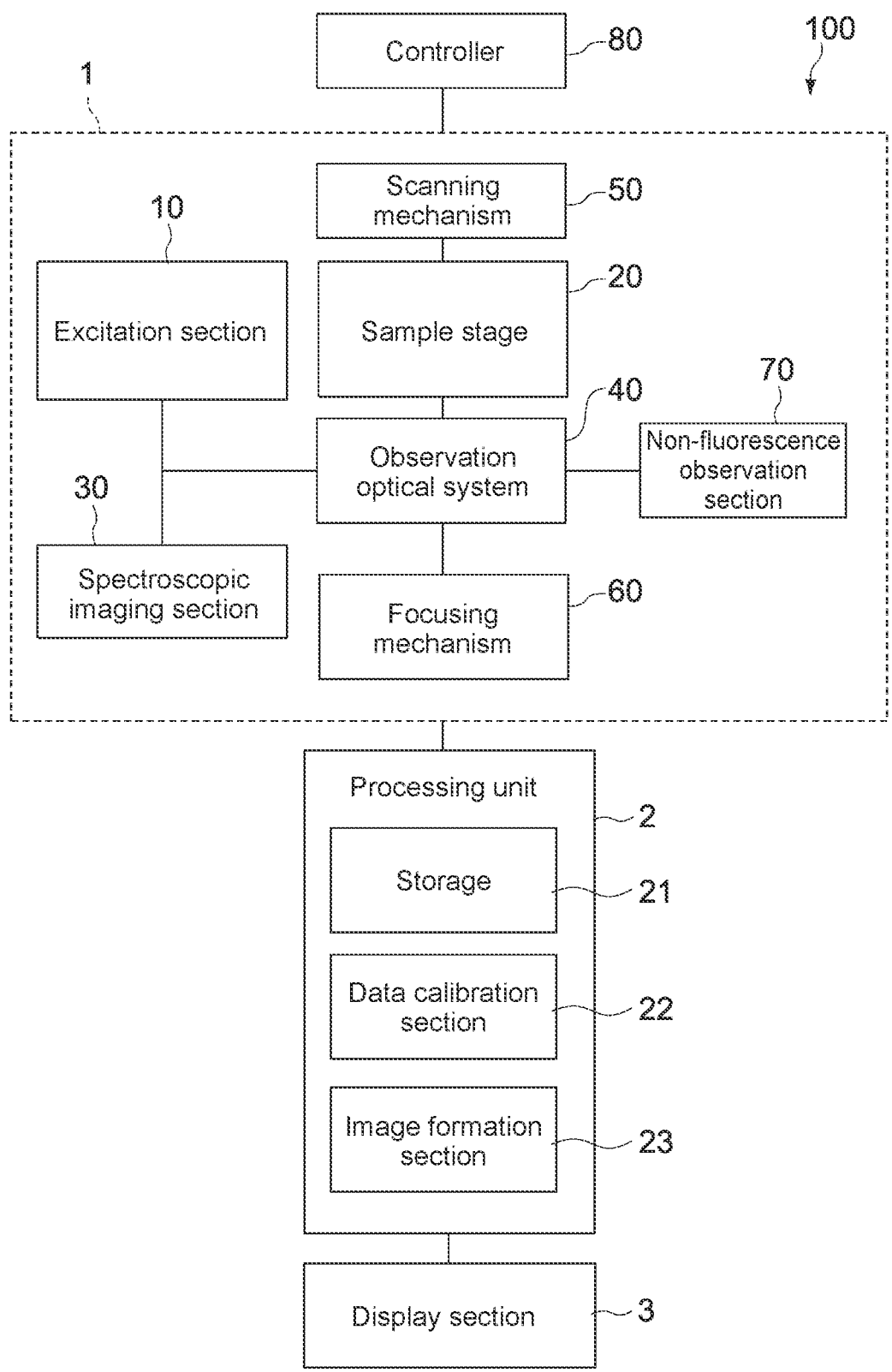
FIG. 1 is a schematic block diagram of a fluorescence observation apparatus according to an embodiment of the present technology.
Figure 2:
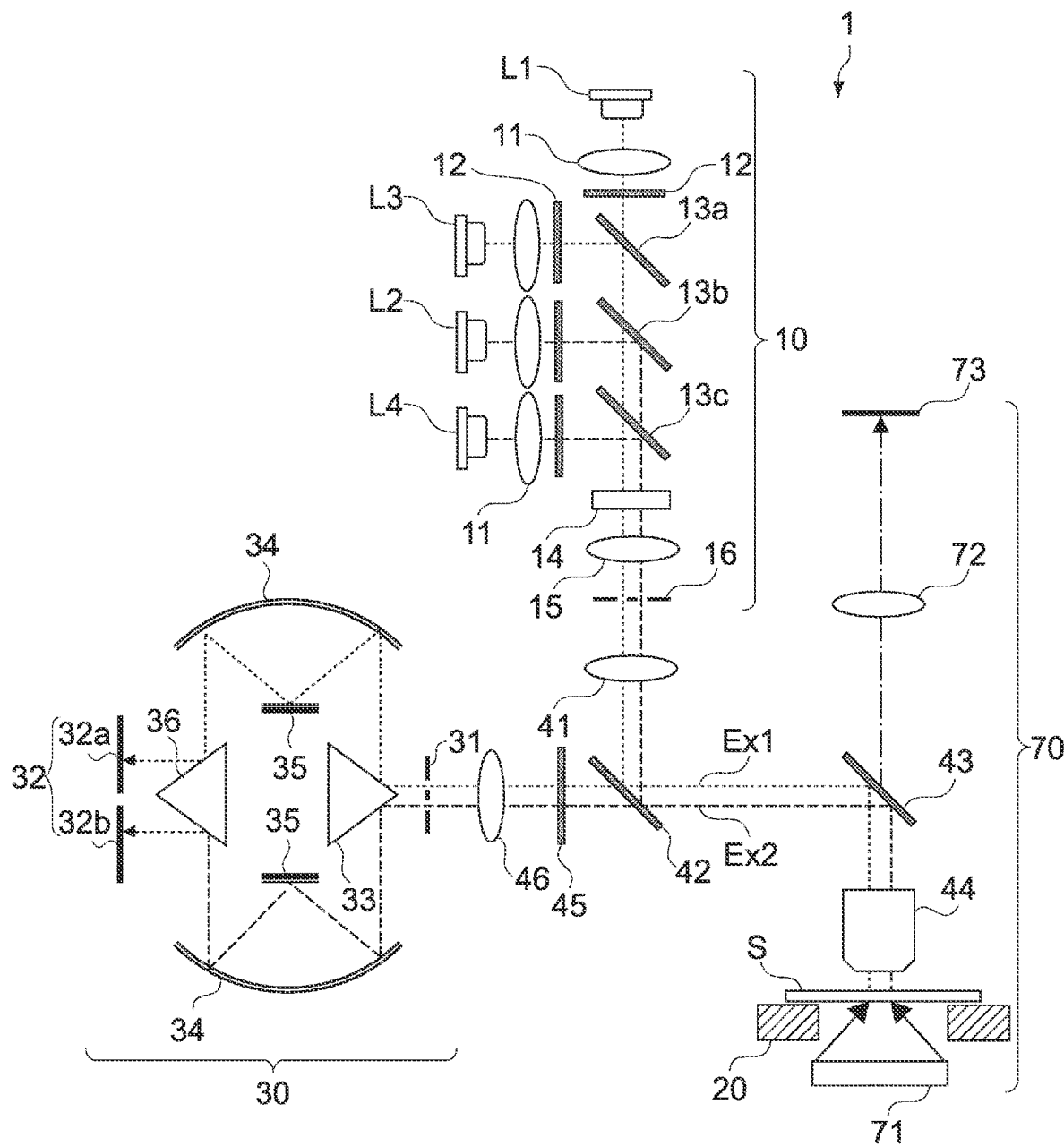
FIG. 2 illustrates an example of an optical system in the fluorescence observation apparatus.

FIG. 1 is a schematic block diagram of a fluorescence observation apparatus according to an embodiment of the present technology, and FIG. 2 illustrates an example of an optical system in the fluorescence observation apparatus.

[Overall Configuration]

A fluorescence observation apparatus 100 of the present embodiment includes an observation unit 1. The observation unit 1 includes an excitation section 10 that irradiates a pathological specimen (a pathological sample) with a plurality of line illuminations of different wavelengths, the line illuminations being arranged parallel to each other on different axes, a stage 20 that supports the pathological specimen, and a spectroscopic imaging section 30 that acquires a linearly excited fluorescence spectrum (spectroscopic data) of the pathological specimen.

Here, being parallel to each other on different axes means that the line illuminations are situated on different axis and parallel to each other. Being on different axes means not being on the same axis, and the distance between the axes is not particularly limited. Being parallel to each other is not limited to being accurately parallel to each other, and includes a state of being approximately parallel to each other. For example, there may be a deviation from a parallel state due to a distortion due to an optical system such as a lens, or due to manufacturing tolerances, and such a state is also considered parallel to each other.

The fluorescence observation apparatus 100 further includes a processing unit 2. On the basis of a fluorescence spectrum of a pathological specimen (hereinafter also referred to as a sample S) acquired by the observation unit 1, the processing unit 2 typically forms an image of the pathological specimen or outputs a distribution of the fluorescence spectrum. Here, for example, the image refers to an image with colors of RGB (red, green, and blue) that is obtained by performing conversion using a component ratio of a dye included in a spectrum, autofluorescence from a sample, and the like, using a waveform of the spectrum, or refers to a distribution of brightness in a specific wavelength range.

The excitation section 10 and the spectroscopic imaging section 30 are connected to the stage 20 through an observation optical system 40 such as an objective 44. The observation optical system 40 includes a function of adjusting to an optimal focus using a focusing mechanism 60. A non-fluorescence observation section 70 used for dark field microscopy or bright field microscopy may be connected to the observation optical system 40.

The fluorescence observation apparatus 100 may be connected to a controller 80 that controls, for example, the excitation section (control of an LD and a shutter), an XY-stage that is a scanning mechanism, the spectroscopic imaging section (a camera), the focusing mechanism (a detector and a Z-stage), and the non-fluorescence observation section (a camera).

The excitation section 10 includes a plurality of light sources L1, L2, . . . that are capable of outputting pieces of light of a plurality of excitation wavelengths Ex1, Ex2, . . . . Each of the plurality of light sources typically includes a light emitting diode (LED), a laser diode (LD), a mercury lamp, or the like. The piece of light of each of the plurality of light sources is changed to a line illumination, and the line illumination is irradiated onto the sample S on the stage 20.

Figure 3:
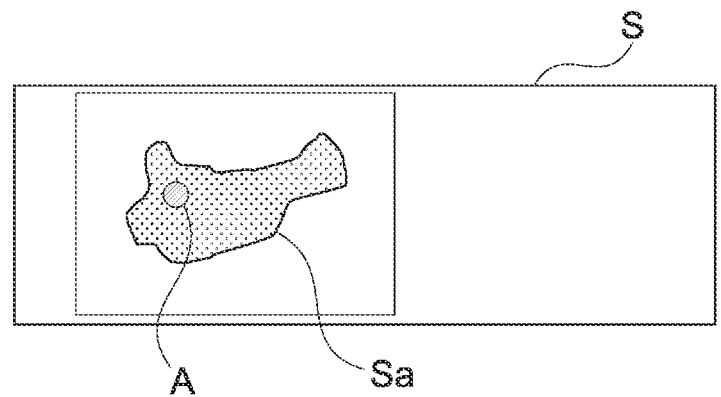
FIG. 3 schematically illustrates a pathological specimen of an observation target.
Figure 4:
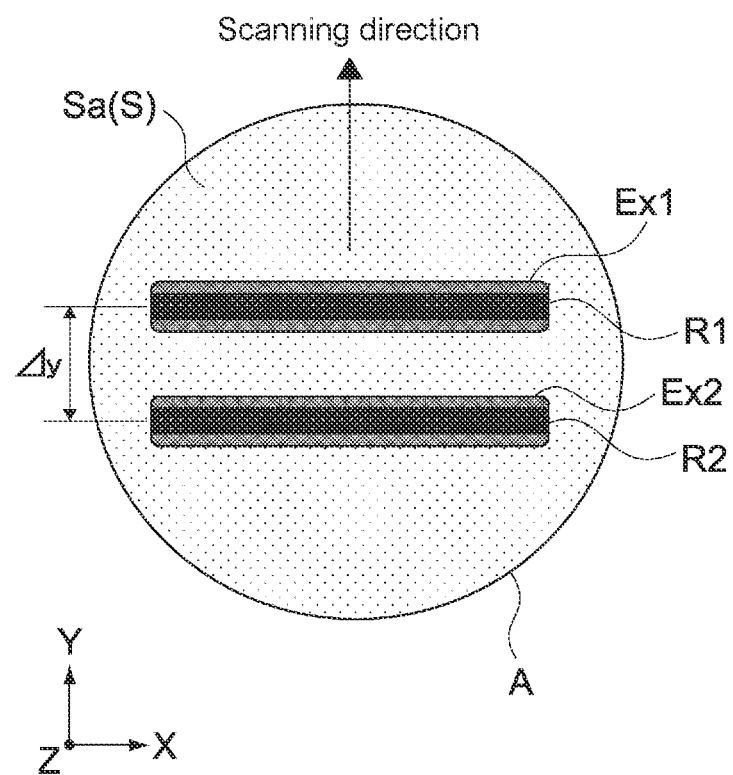
FIG. 4 schematically illustrates how a line illumination is irradiated onto the observation target.

The sample S is typically formed of a slide including an observation target Sa such as a tissue section illustrated in FIG. 3. However, of course, the sample S may be formed of something other than such a slide. The sample S (the observation target Sa) is stained with a plurality of fluorescence dyes. The observation unit 1 magnifies the sample S to a desired magnification to observe the sample S. In an illumination portion that is an enlarged portion A of FIG. 3, a plurality of line illuminations (two (Ex1 and Ex2) in the example) is arranged, and the image-capturing areas R1 and R2 of the spectroscopic imaging section 30 are arranged to overlap illumination areas of the respective line illuminations, as illustrated in FIG. 4. The two line illuminations Ex1 and Ex2 are each parallel to a Z-axis direction, and are arranged away from each other by a specified distance ($\Delta y$) in a Y-axis direction.

The image-capturing areas R1 and R2 respectively correspond to slit portions of an observation slit 31 (FIG. 2) in the spectroscopic imaging section 30. In other words, the same number of slit portions as the number of line illuminations is arranged in the spectroscopic imaging section 30. Although the line width of the illumination is larger than the slit width in FIG. 4, both the case in which the line width of the illumination is larger and the case in which the slit width is larger may be acceptable. When the line width of the illumination is larger than the slit width, a margin used to align the excitation section 10 with the spectroscopic imaging section 30 can be made larger.

The wavelength of the first line illumination Ex1 and the wavelength of the second line illumination Ex2 are different from each other. Pieces of linear fluorescence respectively excited with these line illuminations Ex1 and Ex2 are observed in the spectroscopic imaging section 30 through the observation optical system 40.

The spectroscopic imaging section 30 includes the observation slit 31 including a plurality of slit portions, and at least one imaging device 32 capable of separately receiving the pieces of fluorescence passing through the observation slit 31, in which the piece of fluorescence excited with each of the plurality of line illuminations is allowed to pass through a corresponding one of the plurality of slit portions. A two-dimensional imager such as a charge coupled device (CCD) or a complementary metal-oxide semiconductor (CMOS) is adopted as the imaging device 32. The arrangement of the observation slit 31 in a light path makes it possible to detect fluorescence spectra excited with the respective lines without an overlap of the fluorescence spectra.

The spectroscopic imaging section 30 acquires, from each of the line illuminations Ex1 and Ex2, spectroscopic data (x, $\lambda$) of fluorescence using, as a wavelength channel, a pixel array situated in a certain direction (for example, an orthogonal direction) of the imaging device 32. The acquired spectroscopic data (x, $\lambda$) is recorded in the processing unit 2 in a state in which spectroscopic data is associated with an excitation wavelength with which excitation is performed for the spectroscopic data.

The processing unit 2 may be implemented by hardware elements used in a computer, such as a central processing unit (CPU), a random access memory (RAM), and a read only memory (ROM), and by necessary software. Instead of or in addition to the CPU, a programmable logic device (PLD) such as a field programmable gate array (FPGA), a digital signal processor (DSP), an application specific integrated circuit (ASIC), or the like may be used.

Figure 5:
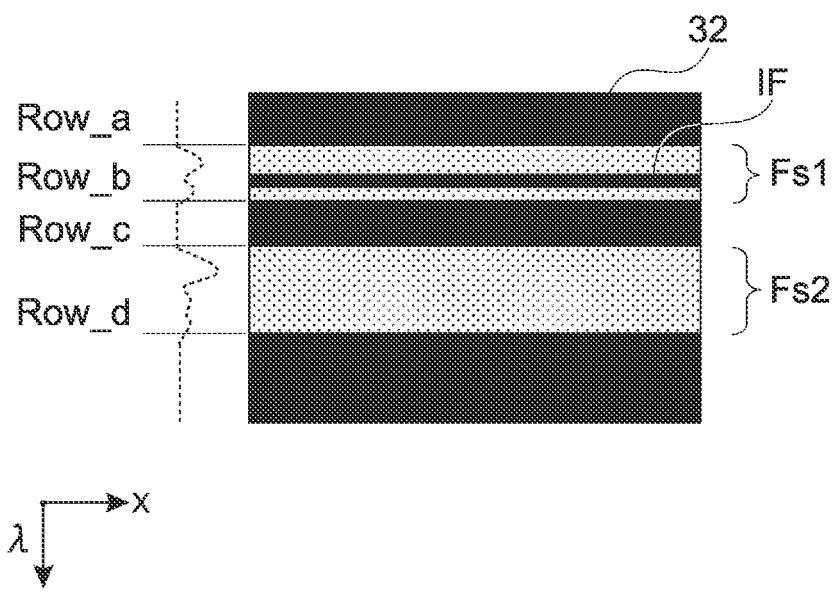
FIG. 5 is a diagram describing a method for acquiring spectroscopic data when an imaging device in the fluorescence observation apparatus includes a single image sensor.
Figure 6:
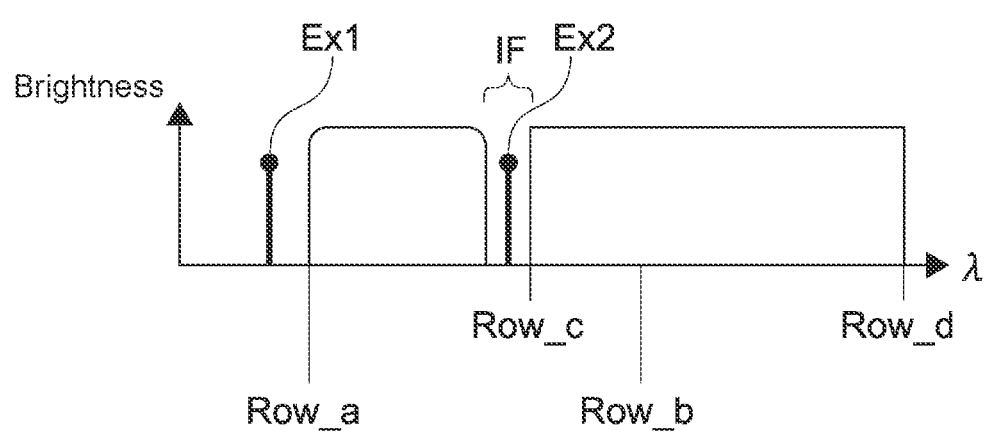
FIG. 6 illustrates the wavelength characteristics of the spectroscopic data acquired in FIG. 5.

The processing unit 2 includes a storage 21 that stores therein spectroscopic data that indicates a correlation between wavelengths of a plurality of line illuminations Ex1 and Ex2 and fluorescence received by the imaging device 32. A storage apparatus such as a nonvolatile semiconductor memory or a hard disk drive is used as the storage 21, and a standard spectrum of autofluorescence related to the sample S and a standard spectrum of only a dye that stains the sample S are stored in the storage 21 in advance. For example, the spectroscopic data (x, $\lambda$) received by the imaging device 32 is acquired as illustrated in FIGS. 5 and 6, and is stored in the storage 21. In the present embodiment, a storage that stores therein a standard spectrum of autofluorescence of the sample S and a standard spectrum of only a dye of the sample S, and a storage that stores therein spectroscopic data (a measurement spectrum) of the sample S that is acquired by the imaging device 32 are formed of the storage 21 in common. However, the storages are not limited to this example, and they may be formed of separate storages.

FIGS. 5 and 6 are diagrams describing a method for acquiring spectroscopic data when the imaging device 32 includes a single image sensor that receives every piece of fluorescence passing through the observation slit 31. In this example, images of fluorescence spectra Fs1 and Fs2 respectively excited with the line illuminations Ex1 and Ex2 are finally formed on a light receiving surface of the imaging device 32 through a spectroscopic optical system (described later) in a state in which the fluorescence spectra Fs1 and Fs2 are shifted from each other by an amount proportional to Δy (refer to FIG. 4).

As illustrated in FIG. 5, information obtained from the line illumination Ex1 is recorded as Row_a and Row_b, and information obtained from the line illumination Ex2 is recorded as Row_c and Row_d. Pieces of data in regions other than the regions of these pieces of information are not read. Consequently, the frame rate of the imaging device 32 can be Row_full/(Row_b−Row_a+Row_d−Row_c) times faster than when read is performed for a full frame.

As illustrated in FIG. 2, a dichroic mirror 42 and a bandpass filter 45 are inserted into a light path on the way such that excitation light (Ex1, Ex2) does not reach the imaging device 32. In this case, an intermittent portion IF is generated in the fluorescence spectrum Fs1 of which an image is formed on the imaging device 32 (refer to FIGS. 5 and 6). The frame rate can be further improved by excluding such an intermittent portion IF from a reading-target region.

Figure 7:
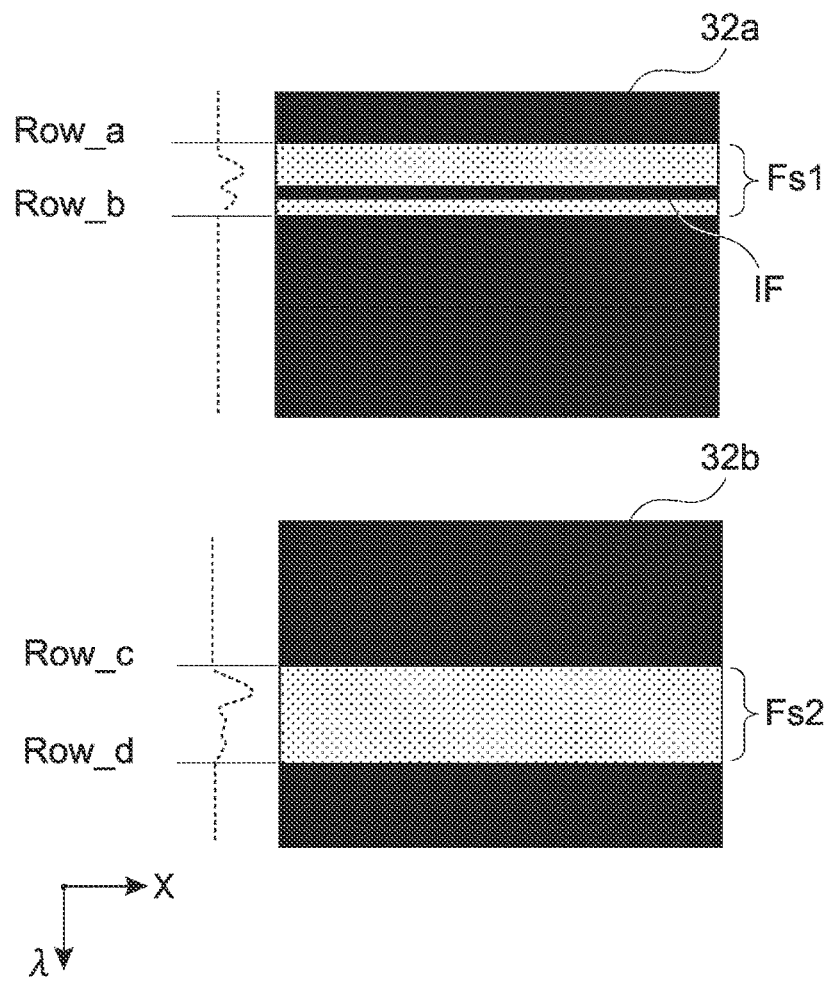
FIG. 7 is a diagram describing the method for acquiring spectroscopic data when the imaging device includes a plurality of image sensors.

As illustrated in FIG. 2, the imaging device 32 may include a plurality of imaging devices 32a and 32b each capable of receiving fluorescence passing through the observation slit 31. In this case, the fluorescence spectra Fs1 and Fs2 respectively excited with the respective line illuminations Ex1 and Ex2 are respectively acquired on the imaging devices 32a and 32b, as illustrated in FIG. 7, and are each stored in the storage 21 in association with excitation light.

Each of the line illuminations Ex1 and Ex2 is not limited to having a single wavelength, and may have a plurality of wavelengths. When each of the line illuminations Ex1 and Ex2 has a plurality of wavelengths, fluorescence excited at each of the plurality of wavelengths also includes a plurality of spectra. In this case, the spectroscopic imaging section 30 includes a wavelength dispersion element used to separate the fluorescence into spectra based on an excitation wavelength. The wavelength dispersion element includes a diffraction grating, a prism, or the like, and is typically arranged in a light path between the observation slit 31 and the imaging device 32.

Figure 8:
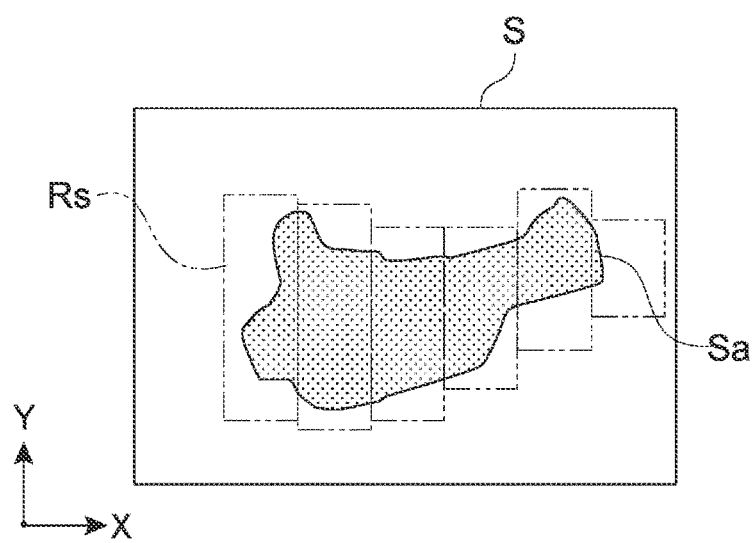
FIG. 8 is a conceptual diagram describing a method for scanning the line illumination irradiated onto the observation target.

The observation unit 1 further includes a scanning mechanism 50 that scans the plurality of line illuminations Ex1 and Ex2 over the stage 20 in the Y-axis direction, that is, in a direction in which the line illuminations Ex1 and Ex2 are arranged. The use of the scanning mechanism 50 makes it possible to continuously record, in the Y-axis direction, dye spectra (fluorescence spectra) that are excited at different excitation wavelengths and are spatially separated from each other by Δy on the sample S (the observation target Sa). In this case, an image-capturing region Rs is divided into multiple regions in an X-axis direction, for example, as illustrated in FIG. 8, and an operation is repeatedly performed, the operation including scanning the sample S in the Y-axis direction, subsequently moving the sample S in the X-axis direction, and further performing scanning in the Y-axis direction. It is possible to capture images of spectroscopic spectra from a sample in a single scan, the spectroscopic spectra being excited at several excitation wavelengths.

Figures 9, 10:
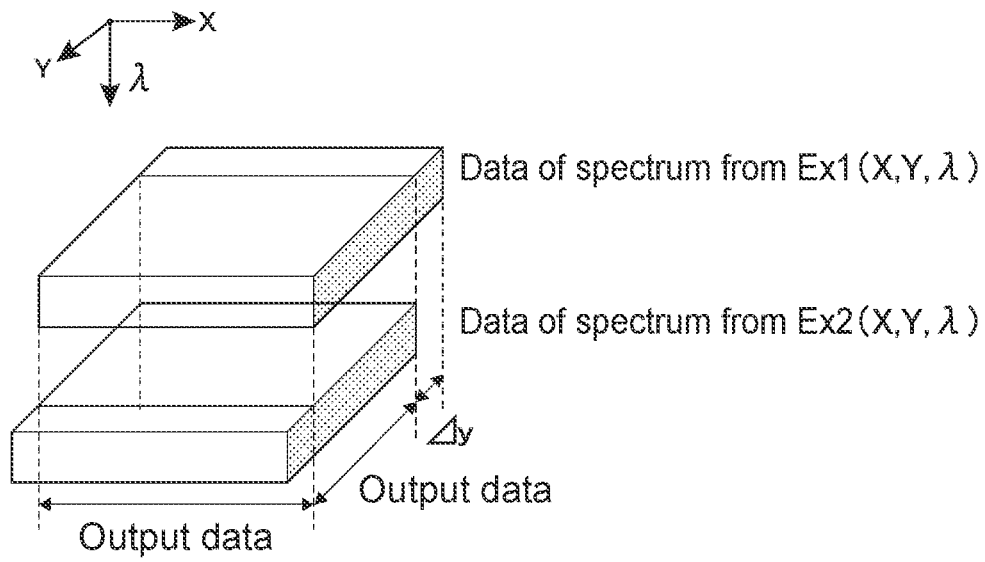
FIG. 9 is a conceptual diagram describing pieces of three-dimensional data (X, Y, λ) acquired using a plurality of line illuminations.
FIG. 10 illustrates configuration examples of a wavelength of an excitation section in the fluorescence observation apparatus.

The scanning mechanism 50 typically scans the stage 20 in the Y-axis direction. However, the plurality of line illuminations Ex1 and Ex2 may be scanned in the Y-axis direction using a galvanometer mirror arranged in the optical system on the way. Finally, three-dimensional data (X, Y, λ) illustrated in FIG. 9 is acquired for each of the plurality of line illuminations Ex1 and Ex2. Three-dimensional data based on one of the line illuminations Ex1 and Ex2 is data obtained by shifting the coordinate by Δy from the coordinate of another of the line illuminations Ex1 and Ex2 with respect to the Y-axis. Thus, correction is performed on the basis of a value of Δy that is recorded in advance, or on the basis of a value of Δy that is calculated from output of the imaging device 32, and data obtained by the correction is output.

In the example described above, the number of line illuminations serving as excitation light is two, but it is not limited to this example. The number of line illuminations may be three, four, or five or more. Further, each line illumination may also include a plurality of excitation wavelengths selected in order to minimize a degradation in a color separation performance. Further, even when the number of line illumination is one, it is possible to obtain a multicolor spectrum by using an excitation light source including a plurality of excitation wavelengths and by recording the excitation wavelength in association with row data acquired by the imaging device, although the separation performance provided by a plurality of line illuminations being parallel to each other on different axes, is not obtained. For example, the configurations illustrated in FIG. 10 may be adopted.

[Observation Unit]

Next, the observation unit 1 is described in detail with reference to FIG. 2. Here, an example of the observation unit 1 to which a configuration example 2 of FIG. 10 is applied is described.

The excitation section 10 includes a plurality of (four in this example) excitation light sources L1, L2, L3, and L4. The excitation light sources L1 to L4 are respectively formed of laser light sources that respectively output pieces of laser light of wavelengths of 405 nm, 488 nm, 561 nm, and 645 nm.

The excitation section 10 further includes a plurality of collimator lenses 11, a plurality of laser line filters 12, dichroic mirrors 13a, 13b, and 13c, a homogenizer 14, a condenser lens 15, and a light-entrance slit 16, in which each of the collimator lenses 11 and each of the laser line filters 12 correspond to a respective one of the excitation light sources L1 to L4.

Laser light emitted from the excitation light source L1 and laser light emitted from the excitation light source L3 are each collimated by the collimator lens 11, each pass through the laser line filter 12 used to narrow its wavelength band, and are arranged on the same axis by the dichroic mirror 13a. The two pieces of laser light on the same axis are each further formed into a beam by the homogenizer 14 such as a fly eye lens and by the condenser lens 15 to become the line illumination Ex1.

Likewise, laser light emitted from the excitation light source L2 and laser light emitted from the excitation light source L4 are arranged on the same axis by the dichroic mirrors 13b and 13c to become a line illumination that is the line illumination Ex2 situated on an axis different from that of the line illumination Ex1. The line illuminations Ex1 and Ex2 form line illuminations on different axes (a primary image) in which the line illuminations Ex1 and Ex2 are situated away from each other by $\Delta y$ in the light-entrance slit 16 (slit conjugate) including a plurality of slit portions, in which each of the line illuminations Ex1 and Ex2 is allowed to pass through a corresponding one of the slit portions.

The primary image is irradiated onto the sample S on the stage 20 through the observation optical system 40. The observation optical system 40 includes a condenser lens 41, the dichroic mirror 42, a dichroic mirror 43, the objective 44, the bandpass filter 45, and a condenser lens 46. The line illuminations Ex1 and Ex2 are collimated by the condenser lens 41 paired with the objective 44, reflected off the dichroic mirrors 42 and 43 to pass through the objective 44, and irradiated onto the sample S.

Illuminations as illustrated in FIG. 4 are formed on the surface of the sample S. Fluorescence excited with each of the illuminations is collected by the objective 44, is reflected off the dichroic mirror 43, passes through the dichroic mirror 42 and the bandpass filter 45 used to block excitation light, and is collected again by the condenser lens 46 to enter the spectroscopic imaging section 30.

The spectroscopic imaging section 30 includes the observation slit 31, the imaging device 32 (32a, 32b), a first prism 33, mirrors 34, diffraction gratings 35 (wavelength dispersion elements), and a second prism 36.

The observation slit 31 is arranged with respect to a light-collecting point of the condenser lens 46, and includes the same number of slit portions as the number of excitation lines. Fluorescence spectra from the two excitation lines having passed through the observation slit 31 are separated by the first prism 33, and each reflected off the grating surface of the diffraction grating 35 through the mirror 34 to be further separated into fluorescence spectra of respective excitation wavelengths. The four fluorescence spectra obtained by performing the separation described above enter the imaging devices 32a, 32b through the mirrors 34 and the second prism 36, and are provided as information (x, $\lambda$) that is spectroscopic data.

The pixel size (nm/pixel) of each of the imaging devices 32a, 32b is not particularly limited, and is set to, for example, between 2 nm and 20 nm, inclusive. The variance may be provided using a pitch of the diffraction grating 35 or may be optically provided, or may be provided using hardware binning of each of the imaging devices 32a, 32b.

The stage 20 and the scanning mechanism 50 form the XY-stage, and move the sample S in the X-axis direction and in the Y-axis direction in order to acquire a fluorescence image of the sample S. In whole slide imaging (WSI), an operation is repeatedly performed, the operation including scanning the sample S in the Y-axis direction, moving the sample S in the X-axis direction, and further scanning the sample S in the Y-axis direction (refer to FIG. 8).

The non-fluorescence observation section 70 includes, for example, a light source 71, the dichroic mirror 43, the objective 44, a condenser lens 72, and an imaging device 73. FIG. 2 illustrates an observation system using dark field illumination as the non-fluorescence observation system.

The light source 71 is arranged below the stage 20, and irradiates illumination light onto the sample S on the stage 20 from a side opposite to the line illuminations Ex1 and Ex2. In the case of the dark field illumination, the light source 71 performs irradiation from the outside of a numerical aperture (NA) of the objective 44, and an image of the light being diffracted by the sample S (a dark field image) and passing through the objective 44, the dichroic mirror 43, and the condenser lens 72 is captured using the imaging device 73. The use of the dark field illumination makes it possible to observe even an apparently transparent sample such as a fluorescently stained sample with contrast.

Note that this dark field image may be observed simultaneously with fluorescence, and may be used for real-time focusing. In this case, a wavelength that does not affect a fluorescence observation may be selected as an illumination wavelength. The non-fluorescence observation section 70 is not limited to being formed of an observation system that acquires a dark field image, and may be formed of an observation system that is capable of acquiring a non-fluorescence image such as a bright field image, a phase contrast image, a phase image, or an in-line-hologram image. For example, various observation methods such as a schlieren method, a phase contrast method, polarized light microscopy, and an epi-illumination method may be adopted as a method for acquiring a non-fluorescence image. The illumination light source is not limited to being situated below the stage, and it may be situated above the stage or around the objective. Further, not only a method for performing focusing control in real time, but also another method such as a pre-focusing map method that records a focus coordinate (Z coordinate) in advance may be adopted.

Figure 11:
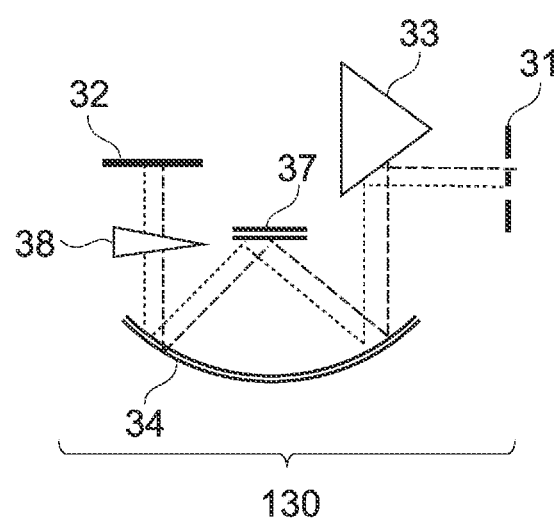
FIG. 11 schematically illustrates another configuration example of a spectroscopic imaging section in the fluorescence observation apparatus.

FIG. 11 schematically illustrates another configuration example of the spectroscopic imaging section. A spectroscopic imaging section 130 illustrated in the figure includes a single imaging device 32. Each piece of fluorescence having passed through the observation slit 31 including a slit portion passes through a relay optical system (the first prism 33, the mirror 34, and a mirror 37) and a wavelength dispersion element (such as a prism) 38 that is arranged on the way, and an image of the piece of fluorescence is formed on the imaging device 32 to be provided as data (x, $\lambda$) (refer to FIG. 5). Here, the number of slit portions is the same as the number of excitation lines. In this case, a value on a pixel basis into which the excitation-light interval $\Delta y$ has been converted is determined such that dispersed spectra do not overlap on the imaging device 32.

[Processing Unit]

Fluorescence spectra acquired by the imaging device 32 (32a, 32b) are output to the processing unit 2. The processing unit 2 includes the storage 21, and further includes a data calibration section 22 that calibrates spectroscopic data stored in the storage 21, and an image formation section 23 that forms a fluorescence image of the sample S on the basis of the spectroscopic data and the interval $\Delta y$ between the line illuminations Ex1 and Ex2.

Figure 12:
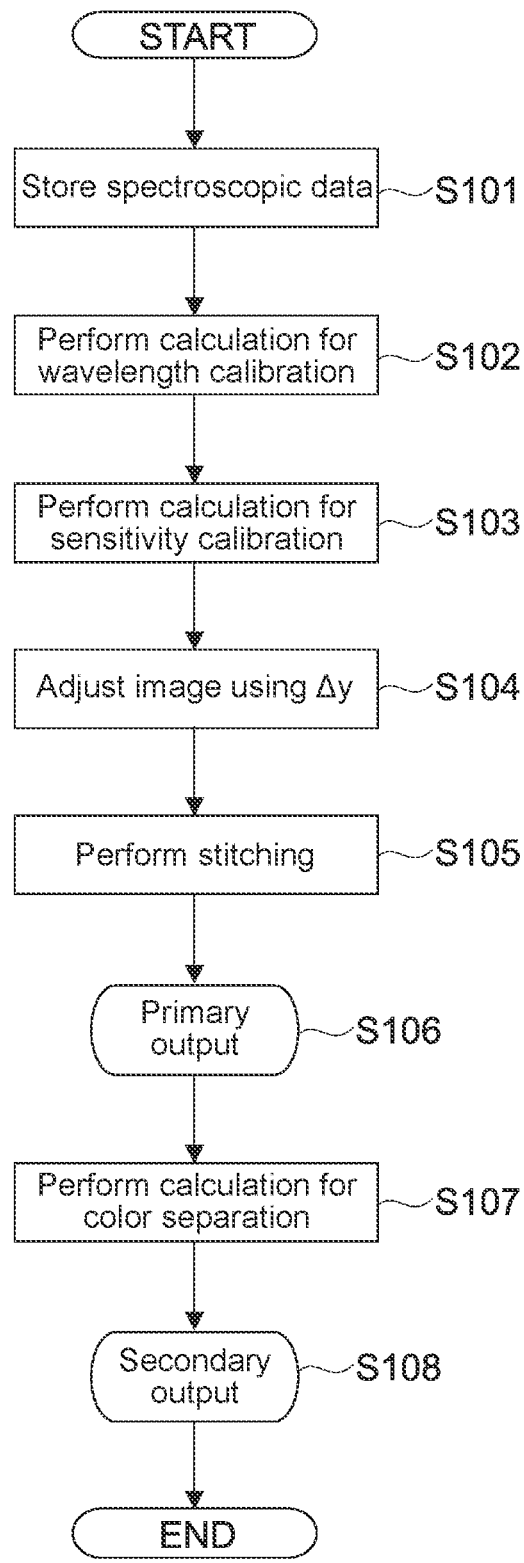
FIG. 12 is a flowchart illustrating an example of a procedure of processing performed in a processing unit in the fluorescence observation apparatus.

FIG. 12 is a flowchart illustrating an example of a procedure of processing performed in the processing unit 2.

The storage 21 stores therein spectroscopic data (the fluorescence spectra Fs1 and Fs2 (refer to FIGS. 5 and 7)) acquired by the spectroscopic imaging section 30 (Step 101). A standard spectrum of autofluorescence related to the sample S and a standard spectrum of only a dye are stored in the storage 21 in advance.

The storage 21 only extracts a wavelength region of interest from a pixel array of the imaging device 32 in the wavelength direction to improve the recording frame rate. The wavelength region of interest corresponds to, for example, a range of visible light (380 nm to 780 nm) or a wavelength range determined by an emission wavelength of a dye that stains the sample S.

Examples of a wavelength region other than the wavelength region of interest include a sensor region in which there exists light of unnecessary wavelength, a sensor region in which there obviously exists no signal, and a region of an excitation wavelength to be blocked by the dichroic mirror 42 or the bandpass filter 45 in a light path on the way.

Further, the wavelength region of interest above the sensor may be switched according to a state of a line illumination. For example, when there are only a few excitation wavelengths used for a line illumination, the wavelength region above the sensor is also limited, and the frame rate becomes higher according to the limitation.

The data calibration section 22 performs calibration including converting the spectroscopic data stored in the storage 21 into data on a wavelength basis from pixel data $(x, \lambda)$ such that all of the pieces of spectral data are complemented such that all of the pieces of spectral data are pieces of data in a unit of wavelength (such as [nm] or [μm]) and have discrete values in common, and such that the complemented pieces of spectral data are output (Step 102).

The pixel data $(x, \lambda)$ is not limited to being well arranged in a pixel column of the imaging device 32, and may be distorted due to a slight tilt or a distortion of an optical system. Thus, when, for example, the data is converted into a unit of wavelength from a unit of pixel using a light source of a known wavelength, conversion into different wavelengths (nm values) is performed with respect to all of the x coordinates. Since it is difficult to deal with data in this state, conversion of the data into data including arranged integers is performed by interpolation (such as linear interpolation or spline interpolation) (Step 102).

Further, there is a possibility that sensitivity will become nonuniform in a long-axis direction of a line illumination (the X-axis direction). The sensitivity becomes nonuniform due to nonuniform illumination or a variation in slit width, and this results in uneven brightness of a captured image. Thus, in order to eliminate such nonuniformity, the data calibration section 22 makes the sensitivity uniform using an arbitrary light source and its representative spectrum (such as an average spectrum and spectral radiance of the light source), and outputs the uniform sensitivity (Step 103). An instrumental error is eliminated by making the sensitivity uniform, and this makes it possible to save the effort to measure an individual component spectrum every time upon analyzing a waveform of a spectrum. Furthermore, it is also possible to output an approximate quantitative value of the number of fluorescence dyes using a brightness value in which the sensitivity has been calibrated.

When the spectral radiance [W/(sr·m²·nm)] is adopted to the calibrated spectrum, sensitivities of the imaging device 32 that correspond to respective wavelengths are also corrected. As described above, by performing calibration such that adjustment to a spectrum used as a reference is performed, it is no longer necessary to measure, for each apparatus, a reference spectrum used to perform calculation for color separation. It is possible to utilize, for a stable dye in the same lot, data obtained in a single image-capturing. Further, when the fluorescence spectra intensity per dye molecule is provided in advance, it is possible to output an approximate value of the number of fluorescence dye molecules, the approximate value being a value into which a brightness value in which the sensitivity has been calibrated, has been converted. This value is highly quantitative since an autofluorescence component has also been separated.

The processing described above is similarly performed with respect to ranges of illuminations performed with the line illuminations Ex1 and Ex2, the ranges of illuminations being situated in the sample S scanned in the Y-axis direction. Accordingly, spectroscopic data $(x, y, \lambda)$ of each fluorescence spectrum is obtained for an entire range of the sample S. The obtained spectroscopic data $(x, y, \lambda)$ is stored in the storage 21.

The image formation section 23 forms a fluorescence image of the sample S on the basis of the spectroscopic data stored in the storage 21 (or the spectroscopic data calibrated by the data calibration section 22), and on the basis of an interval corresponding to an inter-axis distance ($\Delta y$) of the excitation lines Ex1 and Ex2 (Step 104). In the present embodiment, the image formation section 23 forms, as a fluorescence image, an image in which coordinates detected by the imaging device 32 have been corrected using a value corresponding to the interval ($\Delta y$) between the plurality of line illuminations Ex1 and Ex2.

Three-dimensional data based on one of the line illuminations Ex1 and Ex2 is data obtained by shifting the coordinate by $\Delta y$ from the coordinate of another of the line illuminations Ex1 and Ex2 with respect to the Y-axis. Thus, correction is performed on the basis of a value of $\Delta y$ that is recorded in advance, or on the basis of a value of $\Delta y$ that is calculated from output of the imaging device 32, and data obtained by the correction is output. Here, correction is performed with respect to a difference in coordinates detected by the imaging device 32 such that the pieces of three-dimensional data based on the respective line illuminations Ex1 and Ex2 are pieces of data on the same coordinates.

The image formation section 23 performs processing (stitching) for connecting captured images to obtain one large image (WSI) (Step 105). This makes it possible to acquire a multiplexed pathological image related to the sample S (the observation target Sa). The formed fluorescence image is output to the display section 3 (Step 106).

Further, on the basis of a standard spectrum of autofluorescence of the sample S and a standard spectrum of only a dye of the sample S that are stored in the storage 21 in advance, the image formation section 23 performs separation calculation of a component distribution of autofluorescence and a dye of the sample S from spectroscopic data (measurement spectrum) obtained by performing image-capturing. It is possible to adopt least squares, weighted least squares, or the like as a calculation method, and a coefficient is calculated such that the spectroscopic data obtained by performing image-capturing is a linear sum of the standard spectra described above. A distribution of calculated coefficients is stored in the storage 21, and is output to be displayed on the display section 3 in the form of an image (Steps 107 and 108).

[Conclusion]

As described above, the present embodiment makes it possible to provide a multiple fluorescence scanner in which the image-capturing time is not increased even when there is an increase in the number of observation-target dyes.

In other words, data captured by the multiple fluorescence scanner is three-dimensional data $(x, y, \lambda)$. Thus, in the case of performing planar image-capturing, it is not possible to acquire all of the pieces of data $(x, y, \lambda)$ at a time, and thus there is a need to chronologically switch A to perform image-capturing. Further, when irradiation is performed using a plane light source $(x, y)$ to perform excitation, a method for chronologically switching the excitation wavelength is indispensable due to physical constraints. In order to solve these problems, in the present embodiment, fluorescence is excited with a plurality of line illuminations of different wavelengths, the plurality of line illuminations being a plurality of line illuminations arranged parallel to each other on different axes. Each linearly excited fluorescence spectrum is separated into $(x, \lambda)$, and image-capturing is performed at a time using a two-dimensional sensor (an imaging device). This configuration makes it possible to separate the excitation wavelength spatially and not temporally. Thus, the image-capturing time is not increased even when there is an increase in the number of observation-target dyes.

There is a need for one-dimensional scanning (Y direction) to acquire two-dimensional data in this method. Thus, apparently it takes time to perform image-capturing, compared to when a plane excitation is performed. However, if the same light source emission power as that used for a plane excitation is allowed to be used for a line irradiation, it will be possible to excite fluorescence with brighter light since the line irradiation achieves a high power density due to its small area. The reason is that the fluorescence intensity is linearly increased with respect to the excitation power density until the energy absorption of a dye is saturated due to the characteristics of fluorescence. This results in a reduction in exposure time, and thus it is possible to perform image-capturing fastest in principle to obtain (x, y, λ) (since the excited fluorescence is not discarded, a high energy efficiency is achieved, and this makes it possible to acquire data at high speed). Further, due to scanning being performed at a constant speed, this method is advantageous in that it is superior to a plane excitation method in large-area image-capturing, the plane excitation method being a method in which there is a need to repeatedly perform stop-and-go processing.

Further, the present embodiment makes it possible to perform image-capturing on a fluorescence dye with a higher degree of energy efficiency, compared to using a plane-excitation spectroscopic imaging apparatus of a time-division type. Furthermore, it is no longer necessary to measure, for each apparatus, a reference spectrum used to perform calculation for color separation. Thus, it is possible to utilize, for a stable dye in the same lot in a next measurement, data obtained in a single image-capturing. Moreover, the quantitative measurement of a dye molecule makes it possible to quantitatively evaluate the number of antigens in a tissue or on a cell surface.

[Display Section]

Next, the display section 3 is described.

Figure 13:
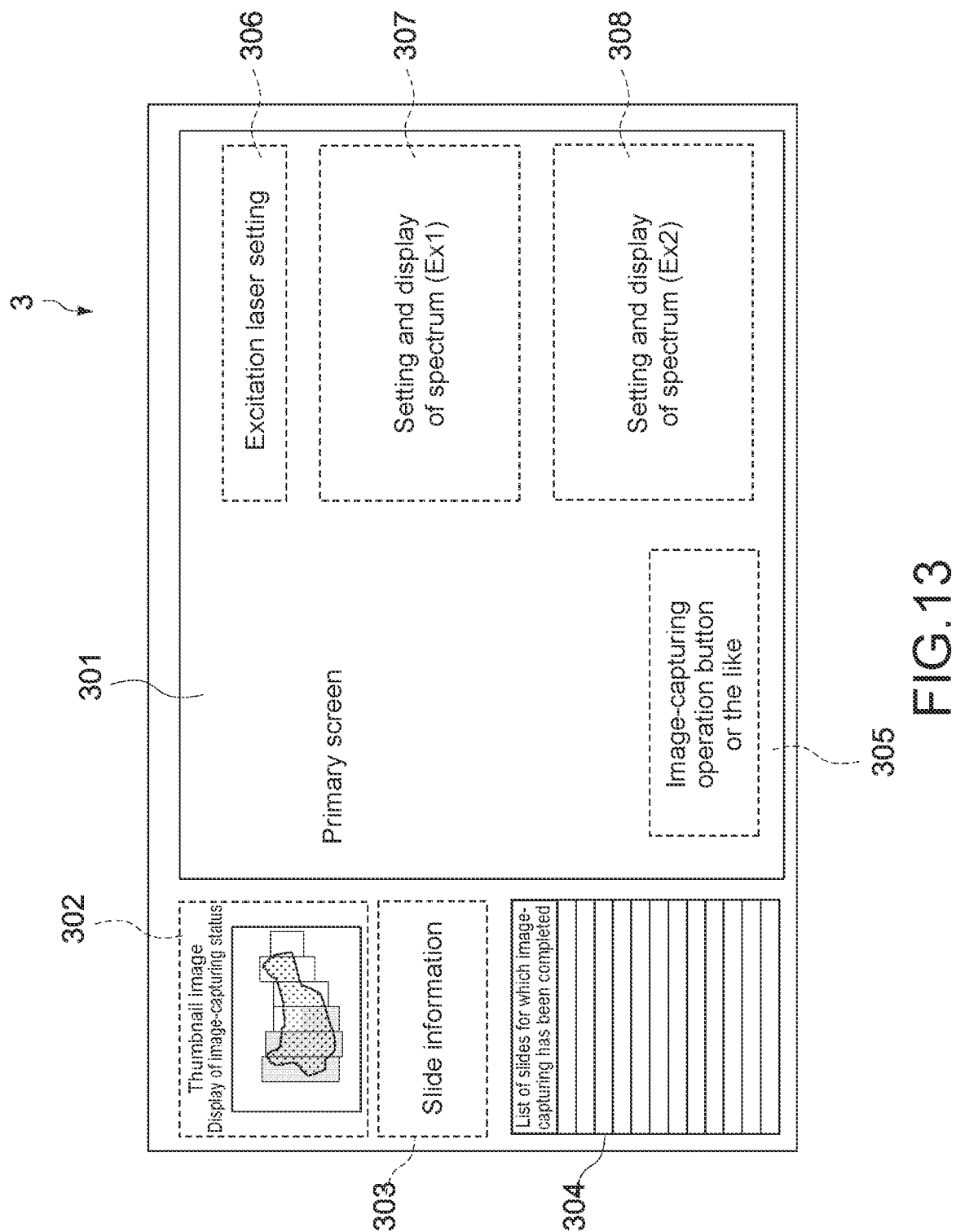
FIG. 13 is a diagram describing a screen of a display section in the fluorescence observation apparatus.

FIG. 13 is a diagram describing a screen of the display section 3. The display section 3 may be formed of a monitor integrally attached to the processing unit 2, or may be a display apparatus connected to the processing unit 2. The display section 3 includes a display element such as a liquid crystal device or an organic EL device, and a touch sensor, and is configured as a user interface (UI) that displays a setting for inputting an image-capturing condition, a captured image, and the like.

As illustrated in FIG. 13, the display section 3 includes a primary screen 301, a thumbnail-image display screen 302, a slide-information display screen 303, and a display screen 304 for a list of slides for which image-capturing has been completed. The primary screen 301 includes a display region 305 for an operation button (a key) or the like used for image-capturing, a setting region 306 for an excitation laser (the excitation section 10), detection setting regions 307 and 308 for fluorescence spectra from the line illuminations Ex1 and Ex2, and the like. It is sufficient if there constantly exists at least one of these display regions 305 to 308, and one of the display regions may include another of the display regions.

The fluorescence observation apparatus 100 sequentially performs takeout of a slide (the sample S) from a slide rack (not illustrated), read of slide information, capturing of a thumbnail image of the slide, setting of an exposure time, and the like. The slide information includes patient information, information regarding a tissue site, a disease, and staining, and the like, and is read from a bar code or the QR code (registered trademark) attached to the slide. The thumbnail image and the slide information of the sample S are respectively displayed on the display screens 302 and 303. Information regarding a slide on which image-capturing has been completed is displayed on the screen 304 in the form of a list.

In addition to a fluorescence image of the sample S, an image-capturing state for a slide on which image-capturing is currently being performed is displayed on the primary screen 301. An excitation laser (the line illuminations Ex1 and Ex2) is displayed or set in the setting region 306, and a fluorescence spectrum from the excitation laser is displayed or set in the detection setting regions 307 and 308.

Figure 14:
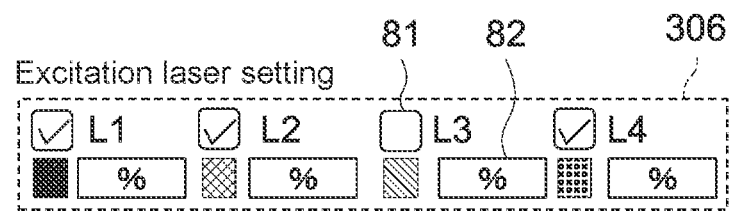
FIG. 14 illustrates an example of a screen configuration of a setting region in the display section, the setting region being a setting region for the excitation section.

FIG. 14 illustrates an example of a screen configuration of the setting region 306 for an excitation laser. Here, ON/OFF of output of each of the excitation light sources L1 to L4 is selected and switched by a touch operation being performed on a checkbox 81. Further, the magnitude of the output of each light source is set through an operation section 82. In this example, the line illumination Ext is set at a single wavelength of the excitation light source L1.

Figure 15:
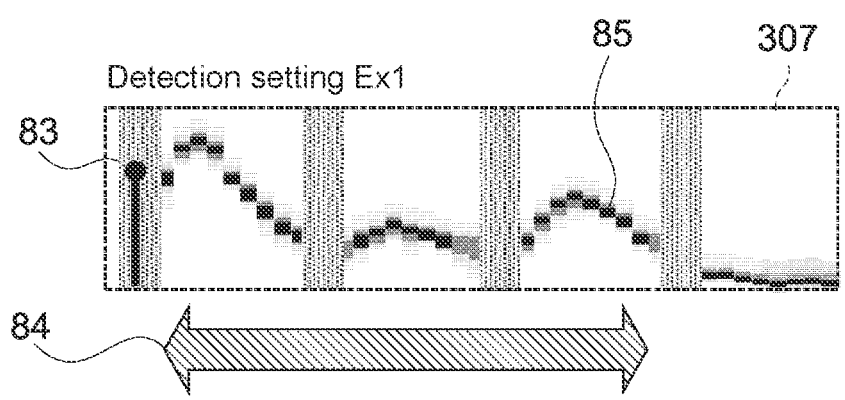
FIG. 15 illustrates an example of a screen configuration of a detection setting region in the display section, the detection setting region being a detection setting region for a fluorescence spectrum from a line illumination.
Figure 16:
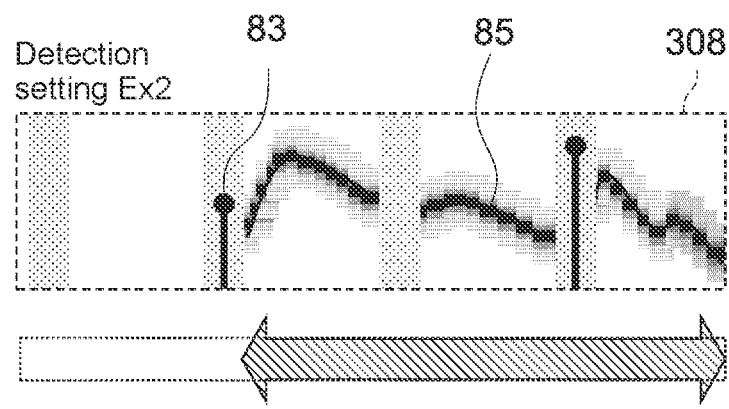
FIG. 16 illustrates an example of a screen configuration of a detection setting region in the display section, the detection setting region being a detection setting region for a fluorescence spectrum from another line illumination.

FIG. 15 illustrates an example of a screen configuration of the detection setting region 307 for a fluorescence spectrum from the line illumination Ext. FIG. 16 illustrates an example of a screen configuration of the detection setting region 308 for a fluorescence spectrum from the line illumination Ex2. The vertical axis represents brightness, and the horizontal axis represents a wavelength.

In FIGS. 15 and 16, an index 83 indicates that the excitation light sources (L1, L2, and L4) are on, and a longer length of the indicator 83 indicates a greater power of a light source. The detection wavelength range for a fluorescence spectrum 85 is set with a setting bar 84.

The method for displaying the fluorescence spectrum 85 is not particularly limited, and, for example, an average spectrum of all of the pixels of the imaging device 32 (wavelength×intensity) is displayed to be the fluorescence spectrum 85. It is possible to set the fluorescence spectrum 85 according to the wavelength and the power of an excitation light source. The fluorescence spectrum 85 is displayed in the form of a current average, or in the form of a waveform, the waveform being calculated from a waveform of which an image is most previously captured, the calculation being performed in consideration of a change in the setting.

Further, as illustrated in FIGS. 15 and 16, the fluorescence spectrum 85 may be displayed by a heat map method in which frequency information regarding a value is indicated with light and dark. In this case, it is also possible to visualize a signal variance that is not realized using an average.

Note that the vertical axis of a graph used to display the fluorescence spectrum 85 is not limited to a linear axis, and may be a logarithmic axis or a hybrid axis (a biexponential axis).

The display section 3 is capable of displaying a fluorescence spectrum separately for each excitation line (Ex1, Ex2). Further, the display section 3 further includes a UI that includes an operation region used to explicitly display a wavelength and a power of a light source, the wavelength being irradiated onto each excitation line. The display section 3 further includes a UI used to display a detection wavelength range for each fluorescence spectrum. In other words, the display section 3 is configured such that a reading region of the imaging device 32 is changed on the basis of the set wavelength range.

This makes it possible to present an image-capturing condition to a user in an easy-to-understand manner in a fluorescence observation apparatus in which excitation is performed on different axes. In particular, by providing the detection setting regions 307 and 308 for fluorescence spectra to the display section 3, it is possible to display, in an easy-to-understand manner, a relationship between an excitation line and an excitation wavelength, and a relationship between an excitation wavelength and an image-capturing wavelength range even when excitation is performed on different axes.

The display section 3 displays, on the primary screen 301, a fluorescence image of the sample S that is output from the image formation section 23. The fluorescence image output from the image formation section 23 to the display section 3 is presented to the user in a state in which correction has been performed using a value (the interval $\Delta y$ between the line illuminations Ex1 and Ex2) that corresponds to a difference in detected coordinates between slits on different axes (the respective slit portions of the observation slit 31). This enables the user to recognize an image obtained by multiply-displaying pieces of decomposition image data without being aware of a difference between detected positions on different axes.

Figure 17:
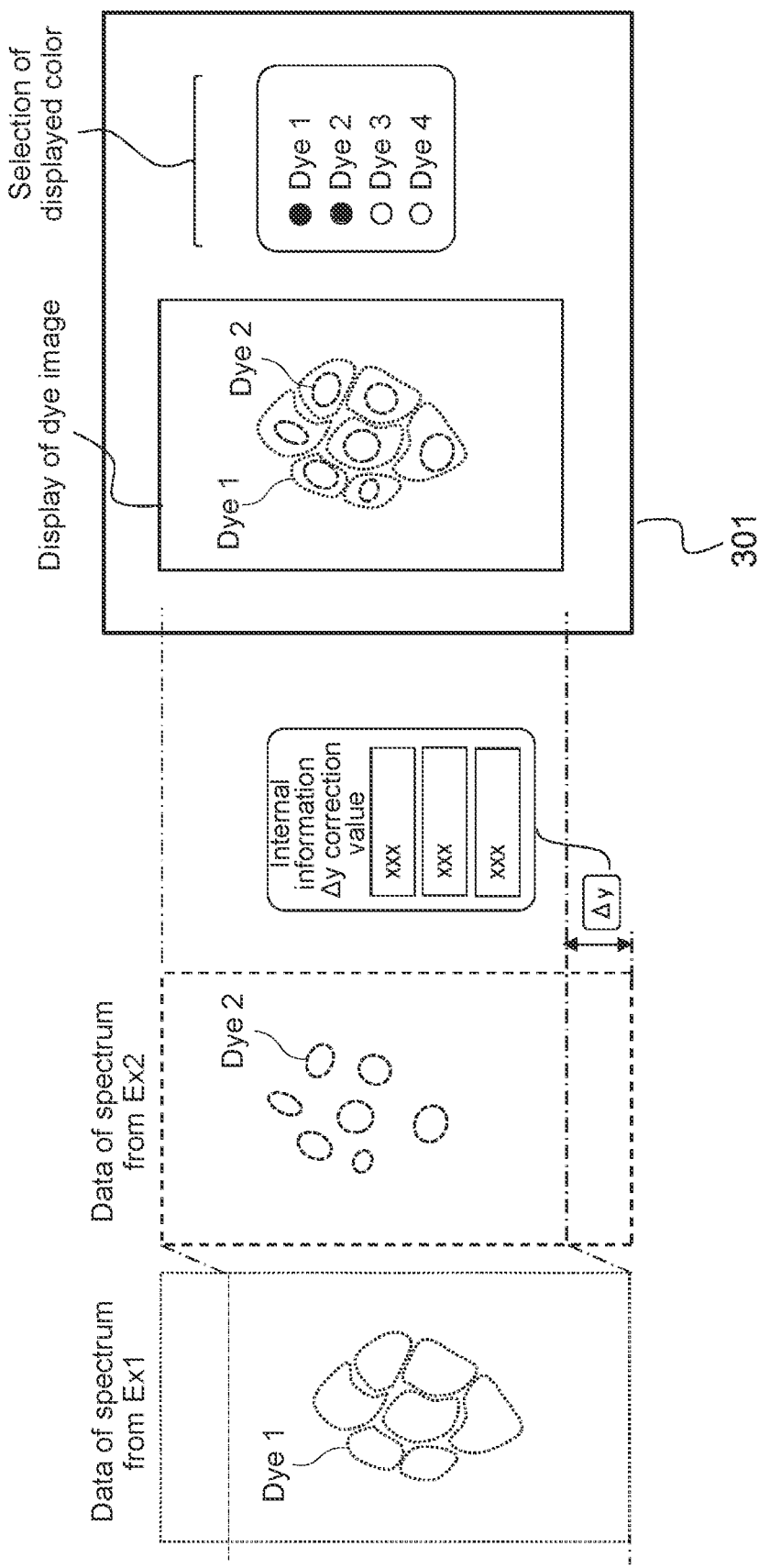
FIG. 17 is a schematic diagram conceptually illustrating a relationship between fluorescence spectrum data and a fluorescence image displayed on the display section.

For example, as illustrated in FIG. 17, a plurality of decomposition images (an image related to a dye 1 and an image related to a dye 2) is generated using pieces of spectral data based on the plurality of line illuminations Ex1 and Ex2, and the respective images of different colors are superimposed to be displayed on the primary screen 301. Here, the image related to the dye 1 is superimposed on the image related to the dye 2 by performing correction with respect to a difference in Y coordinate that corresponds to $\Delta y$.

Each decomposition image corresponds to a standard spectrum used for separation calculation, that is, a staining dye. In addition to a dye image in which respective decomposition images are superimposed, a screen for selecting a displayed dye may be displayed on the primary screen 301. In this case, the image display is switched in conjunction with selection of a dye, and only images corresponding to the dyes 1 and 2 are displayed when the dyes 1 and 2 are selected, as illustrated in FIG. 17.

The correction value $\Delta y$ described above is stored in the storage 21 and managed as internal information. The display section 3 may be capable of displaying information regarding $\Delta y$, or may be capable of changing the displayed $\Delta y$. The correction value ($\Delta y$) may include not only a value used to perform correction with respect to a distance between slits (or an interval between line illuminations), but also a value used to perform correction with respect to an amount of distortion such as distortion in an optical system. When a spectrum of each dye is detected using a different camera (an imaging device), the correction value ($\Delta y$) may include a correction amount related to detected coordinates in the Y-axis direction with respect to each camera.

<Modification>

In the embodiment described above, the processing of adjusting an image using $\Delta y$ (S104 in FIG. 12) and the stitching processing (S105 in the same figure) are respectively performed in the processing unit 2 before the processing of calculation for color separation (S107 in the same figure). However, the processing procedure is not limited to this. This procedure has the advantage that not only a color-separation image but also stitching data of spectral data (spectroscopic data) is obtained. On the other hand, a huge amount of data is stored in the storage 21. Thus, at least one of the processing of adjusting an image using $\Delta y$ or the stitching processing may be performed after the processing of calculation for color separation, as illustrated in FIGS. 18 and 19.

Figure 18:
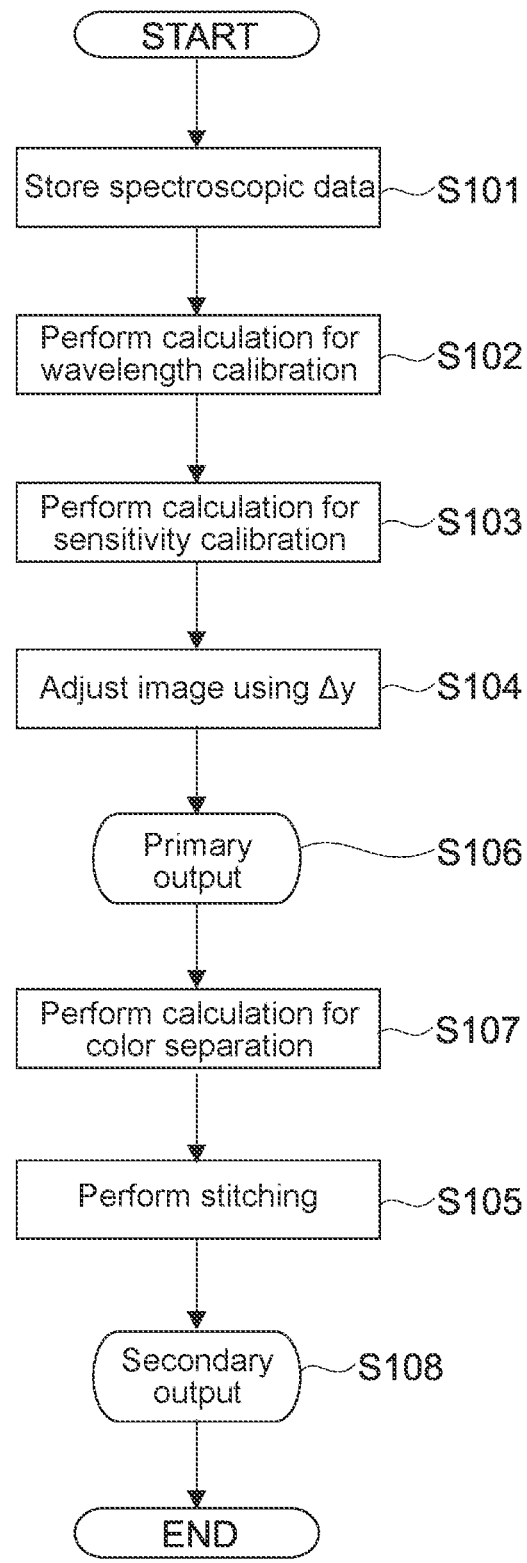
FIG. 18 is a flowchart illustrating a modification of the procedure of the processing performed in the processing unit.

FIG. 18 illustrates an example of the processing procedure in which the stitching processing (S105) is performed after the processing of calculation for color separation (S107). In this example, stitching is not performed with respect to spectral data having a large data size, but stitching is performed only with respect to an image in which calculation for color separation has been performed. In this case, the processing of adjusting an image using $\Delta y$ (S104) is performed with respect to the spectral data before calculation is performed for color separation. This example makes it possible to improve the SN ratio of a separation image by performing color separation with respect to data obtained by connecting pieces of spectral data of a plurality of excitation lines.

Figure 19:
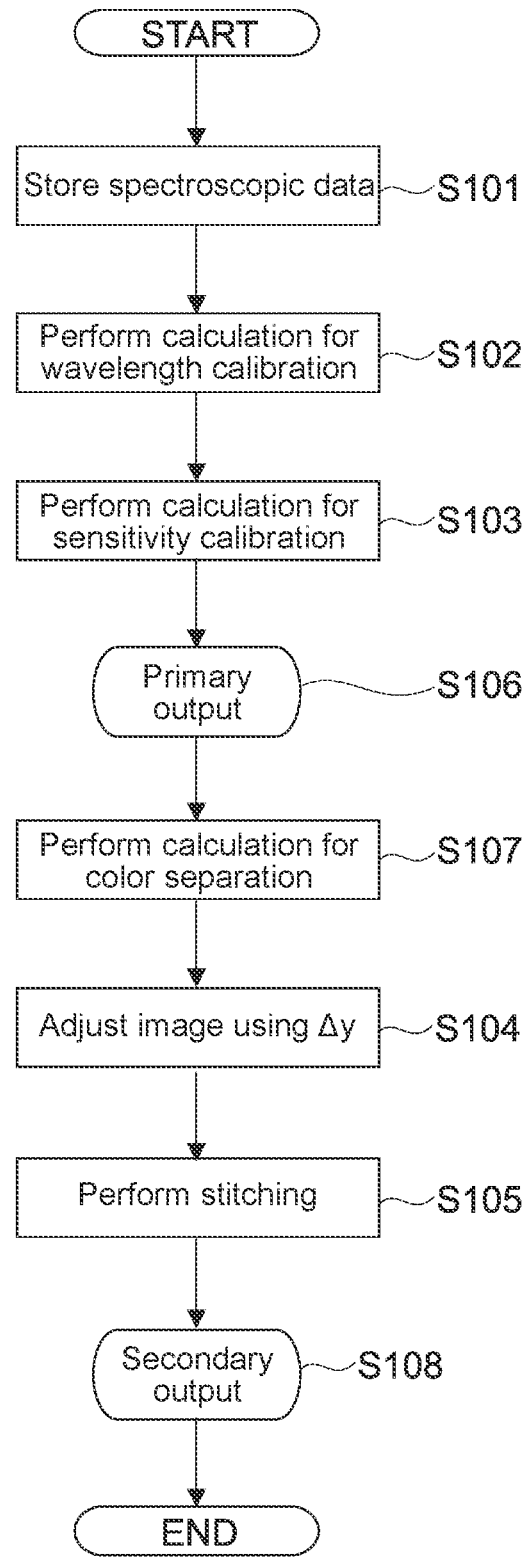
FIG. 19 is a flowchart illustrating another modification of the procedure of the processing performed in the processing unit.

On the other hand, FIG. 19 illustrates an example of the processing procedure in which the processing of adjusting an image using $\Delta y$ (S104) and the stitching processing (S105) are performed after the processing of calculation for color separation (S107). In this example, the SN ratio of a separation image is not expected to be improved since stitching is not performed with respect to spectral data. However, it is possible to perform a higher level of alignment correction such as alignment correction in consideration of a subpixel, since the processing of adjusting an image using $\Delta y$ is performed with respect to a separation image with a small amount of data.

Next, a modification of the configuration of the fluorescence observation apparatus 100 described above is described.

Figure 20:
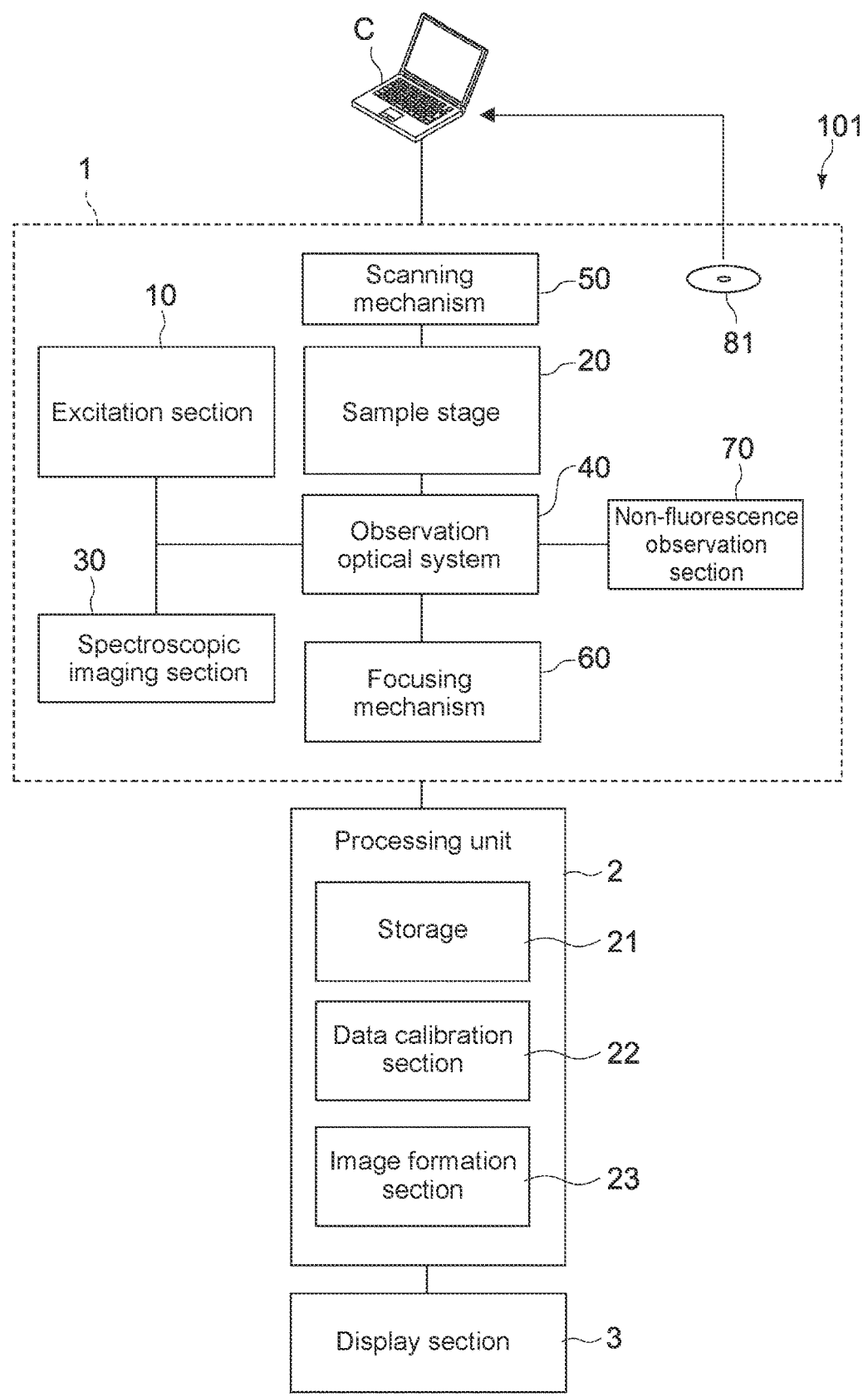
FIG. 20 is a schematic block diagram illustrating a modification of the fluorescence observation apparatus.
Figure 21:
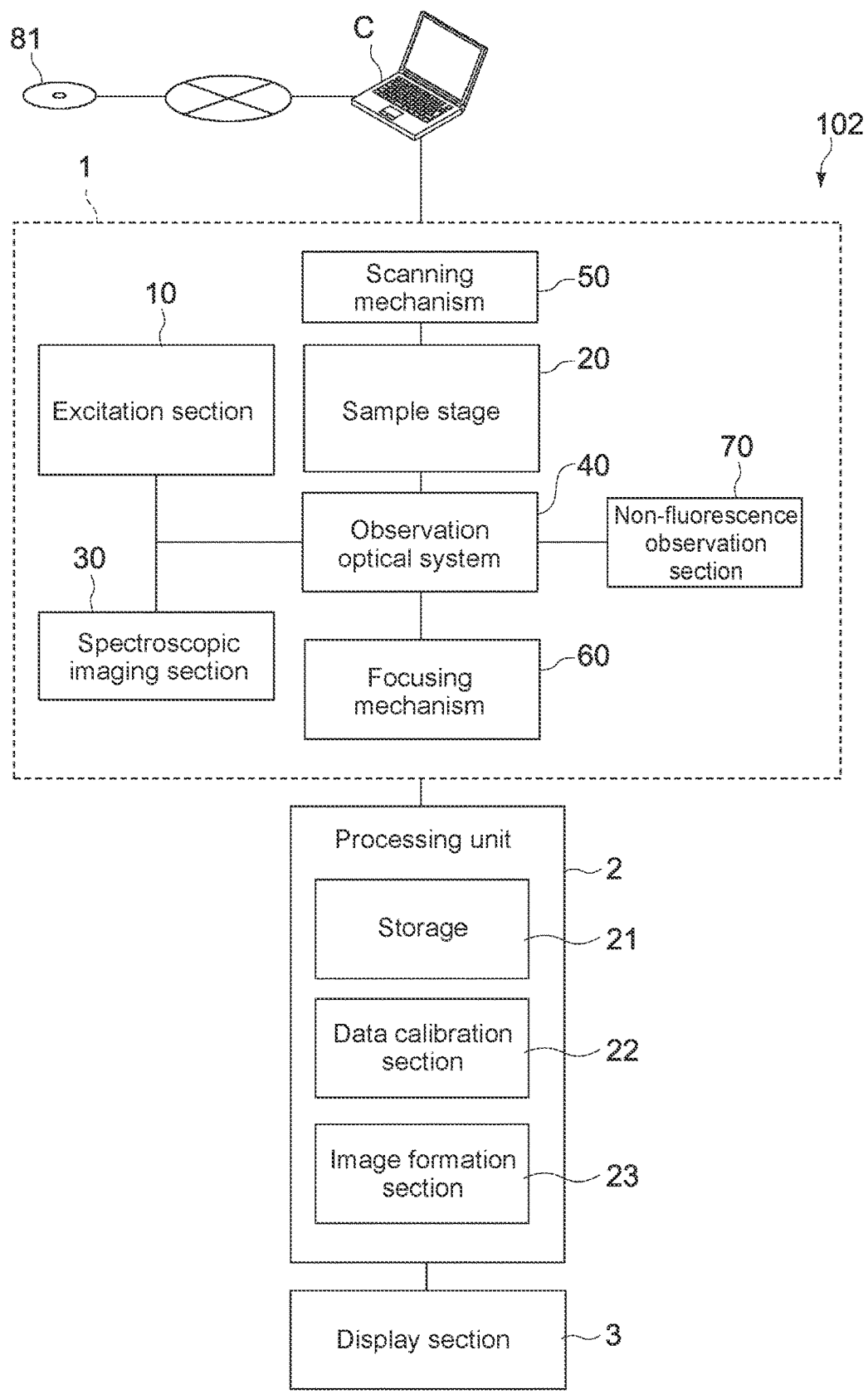
FIG. 21 is a schematic block diagram illustrating another modification of the fluorescence observation apparatus.

FIG. 20 is a schematic block diagram of a fluorescence observation apparatus 101 according to a first modification, and FIG. 21 is a schematic block diagram of a fluorescence observation apparatus 102 according to a second modification. The fluorescence observation apparatuses 101 and 102 each include the observation unit 1, the processing unit 2, the display section 3, and a control program 81.

The control program 81 is a program that causes the fluorescence observation apparatuses 101 and 102 to perform the same function as a control function performed by the controller 80 of the fluorescence observation apparatus 100 described above. In the fluorescence observation apparatus 101 illustrated in FIG. 20, the control program 81 is provided in a state of being stored in a recording medium such as a magnetic disk, an optical disk, a magneto-optical disk, or a flash memory, and is downloaded to and used by a computer C or the like that is connected to the fluorescence observation apparatus 101.

On the other hand, in the fluorescence observation apparatus 102 illustrated in FIG. 21, the control program 81 distributed from the outside through a network such as the Internet is downloaded to and used by the computer C or the like. In this case, the fluorescence observation apparatus 102 and a code used to acquire the control program 81 are packaged to be provided.

The electronic computer C to which the control program 81 has been downloaded acquires various data used to control the excitation section 10, the spectroscopic imaging section 30, the scanning mechanism 50, the focusing mechanism 60, the non-fluorescence observation section 70, and the like. A control algorithm of the downloaded control program 81 is executed, and control conditions for the fluorescence observation apparatus 101, 102 are calculated. Conditions for the fluorescence observation apparatus 101, 102 are automatically controlled by the computer C giving an instruction to the fluorescence observation apparatus 101, 102 on the basis of the calculated conditions.

Note that the present technology may also take the following configurations.

(1) A fluorescence observation apparatus, including:
a stage that is capable of supporting a fluorescently stained pathological specimen;
an excitation section that irradiates the pathological specimen on the stage with a plurality of line illuminations of different wavelengths, the plurality of line illuminations being a plurality of line illuminations situated on different axes and parallel to a certain-axis direction; and
a spectroscopic imaging section that includes at least one imaging device capable of separately receiving pieces of fluorescence respectively excited with the plurality of line illuminations.

(2) The fluorescence observation apparatus according to (1), in which
the excitation section is configured to irradiate, onto the pathological specimen and as the plurality of line illuminations, a plurality of line illuminations each having different wavelengths in combination.

(3) The fluorescence observation apparatus according to (2), in which
the spectroscopic imaging section further includes a wavelength dispersion element that separates each of the pieces of fluorescence respectively excited with the plurality of line illuminations.

(4) The fluorescence observation apparatus according to any one of (1) to (3), in which
the spectroscopic imaging section further includes an observation slit including a plurality of slit portions, each of the pieces of fluorescence respectively excited with the plurality of line illuminations being allowed to pass through a corresponding one of the plurality of slit portions.

(5) The fluorescence observation apparatus according to any one of (1) to (5), further including
a scanning mechanism that scans the plurality of line illuminations over the stage in a direction orthogonal to the certain-axis direction.

(6) The fluorescence observation apparatus according to any one of (1) to (5), further including
a processing unit that includes a storage that stores therein spectroscopic data that indicates a correlation between a wavelength of each of the plurality of line illuminations and fluorescence received by the imaging device.

(7) The fluorescence observation apparatus according to (6), in which
the processing unit further includes an image formation section that forms a fluorescence image of the pathological specimen on the basis of the spectroscopic data stored in the storage and an interval between the plurality of line illuminations.

(8) The fluorescence observation apparatus according to (7), in which
the image formation section forms, as the fluorescence image, an image in which coordinates detected by the imaging device have been corrected using a value corresponding to the interval between the plurality of line illuminations.

(9) The fluorescence observation apparatus according to (6), in which
the processing unit further includes a data calibration section that calibrates spectroscopic data stored in the storage.

(10) The fluorescence observation apparatus according to any one of (7) to (9), in which
the storage stores therein standard spectra in advance, the standard spectra being a standard spectrum of autofluorescence related to the pathological specimen and a standard spectrum of only a dye that stains the pathological specimen, and
the image formation section outputs a component distribution of the spectroscopic data on the basis of the standard spectrum of the autofluorescence and the standard spectrum of only the dye.

(11) The fluorescence observation apparatus according to (4), in which
the imaging device includes a plurality of imaging devices each capable of receiving the fluorescence passing through the observation slit.

(12) The fluorescence observation apparatus according to any one of (1) to (11), further including:
a non-fluorescence observation section that includes a light source that illuminates the pathological specimen on the stage; and
an imaging section that acquires a non-fluorescence image of the pathological specimen.

(13) The fluorescence observation apparatus according to any one of (1) to (12), further including:
a display section that displays fluorescence spectra separately for each of the plurality of line illuminations, the fluorescence spectra being respectively excited with the plurality of line illuminations.

(14) The fluorescence observation apparatus according to (13), in which
the display section includes an operation region in which a wavelength and output of each of the plurality of line illuminations are allowed to be set.

(15) The fluorescence observation apparatus according to (13) or (14), in which
the display section includes a display region used to display a detection wavelength range for the fluorescence spectrum.

(16) A fluorescence observation method, including:
irradiating a pathological specimen on a stage with a plurality of line illuminations of different wavelengths, the plurality of line illuminations being a plurality of line illuminations situated on different axes and parallel to a certain-axis direction; and
separately receiving pieces of fluorescence respectively excited with the plurality of line illuminations.

(17) The fluorescence observation method according to (16), further including
scanning the plurality of line illuminations over the stage in a direction orthogonal to the certain-axis direction.

(18) The fluorescence observation method according to (16) or (17), in which
a plurality of line illuminations each having different wavelengths in combination is used as the plurality of line illuminations.

REFERENCE SIGNS LIST 1 observation unit
2 processing unit
3 display section
10 excitation section
20 stage 21 storage
22 data calibration section
23 image formation section
30, 130 spectroscopic imaging section
31 observation slit
32, 32a, 32b imaging device
35 diffraction grating
38 prism
50 scanning mechanism
70 non-fluorescence observation section
80 controller
81 control program
100,101,102 fluorescence observation apparatus
Ex1, Ex2 line illumination
S sample

The invention claimed is:

1. A fluorescence observation apparatus, comprising:
a stage that is capable of supporting a fluorescently stained pathological specimen;
an excitation section that irradiates the pathological specimen on the stage with a plurality of line illuminations of different wavelengths, the plurality of line illuminations being a plurality of line illuminations situated on different axes and being collimated by a collimator to a certain-axis direction; and
a spectroscopic imaging section that includes at least one imaging device capable of separately receiving pieces of fluorescence respectively excited with the plurality of line illuminations, wherein optical axes of the plurality of line illuminations are parallel between an objective lens and the pathological specimen and wherein optical axes of the separately-received pieces of fluorescence are parallel when incident on the spectroscopic imaging section.

2. The fluorescence observation apparatus according to claim 1, wherein
the excitation section is configured to irradiate, onto the pathological specimen and as the plurality of line illuminations, a plurality of line illuminations each having different wavelengths in combination.

3. The fluorescence observation apparatus according to claim 2, wherein
the spectroscopic imaging section further includes a wavelength dispersion element that separates each of the pieces of fluorescence respectively excited with the plurality of line illuminations.

4. The fluorescence observation apparatus according to claim 1, wherein
the spectroscopic imaging section further includes an observation slit including a plurality of slit portions, each of the pieces of fluorescence respectively excited with the plurality of line illuminations being allowed to pass through a corresponding one of the plurality of slit portions.

5. The fluorescence observation apparatus according to claim 1, further comprising
a scanning mechanism that scans the plurality of line illuminations over the stage in a direction orthogonal to the certain-axis direction.

6. The fluorescence observation apparatus according to claim 1, further comprising
a processing unit that includes a storage that stores therein spectroscopic data that indicates a correlation between a wavelength of each of the plurality of line illuminations and fluorescence received by the imaging device.

7. The fluorescence observation apparatus according to claim 6, wherein
the processing unit further includes an image formation section that forms a fluorescence image of the pathological specimen on a basis of the spectroscopic data stored in the storage and an interval between the plurality of line illuminations.

8. The fluorescence observation apparatus according to claim 7, wherein
the image formation section forms, as the fluorescence image, an image in which coordinates detected by the imaging device have been corrected using a value corresponding to the interval between the plurality of line illuminations.

9. The fluorescence observation apparatus according to claim 6, wherein
the processing unit further includes a data calibration section that calibrates spectroscopic data stored in the storage.

10. The fluorescence observation apparatus according to claim 7, wherein
the storage stores therein standard spectra in advance, the standard spectra being a standard spectrum of autofluorescence related to the pathological specimen and a standard spectrum of only a dye that stains the pathological specimen, and
the image formation section outputs a component distribution of the spectroscopic data on a basis of the standard spectrum of the autofluorescence and the standard spectrum of only the dye.

11. The fluorescence observation apparatus according to claim 4, wherein
the imaging device includes a plurality of imaging devices each capable of receiving the fluorescence passing through the observation slit.

12. The fluorescence observation apparatus according to claim 1, further comprising:
a non-fluorescence observation section that includes a light source that illuminates the pathological specimen on the stage; and
an imaging section that acquires a non-fluorescence image of the pathological specimen.

13. The fluorescence observation apparatus according to claim 1, further comprising:
a display section that displays fluorescence spectra separately for each of the plurality of line illuminations, the fluorescence spectra being respectively excited with the plurality of line illuminations.

14. The fluorescence observation apparatus according to claim 13, wherein
the display section includes an operation region in which a wavelength and output of each of the plurality of line illuminations are allowed to be set.

15. The fluorescence observation apparatus according to claim 13, wherein
the display section includes a display region used to display a detection wavelength range for the fluorescence spectrum.

16. A fluorescence observation method, comprising:
irradiating a pathological specimen on a stage with a plurality of line illuminations of different wavelengths, the plurality of line illuminations being a plurality of line illuminations situated on different axes and being collimated by a collimator to a certain-axis direction; and
separately receiving pieces of fluorescence respectively excited with the plurality of line illuminations, wherein optical axes of the plurality of line illuminations are parallel between an objective lens and the pathological specimen and wherein optical axes of the separately-received pieces of fluorescence are parallel when incident on a spectroscopic imaging section.

17. The fluorescence observation method according to claim 16, further comprising scanning the plurality of line illuminations over the stage in a direction orthogonal to the certain-axis direction.

18. The fluorescence observation method according to claim 16, wherein
   a plurality of line illuminations each having different wavelengths in combination is used as the plurality of line illuminations.

\* \* \* \* \*